United States Patent
Pandey et al.

(10) Patent No.: US 11,222,028 B2
(45) Date of Patent: Jan. 11, 2022

(54) REPORT RECOMMENDATION ENGINE

(71) Applicant: Oracle International Corporation, Redwood Shores, CA (US)

(72) Inventors: Prashant Pandey, Jhansi (IN); Eakta Aggarwal, Hyderabad (IN); Richard Yungning Liu, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 579 days.

(21) Appl. No.: 16/248,502

(22) Filed: Jan. 15, 2019

(65) Prior Publication Data

US 2020/0226141 A1    Jul. 16, 2020

(51) Int. Cl.
| | |
|---|---|
| *G06F 16/00* | (2019.01) |
| *G06F 16/2457* | (2019.01) |
| *G06F 16/248* | (2019.01) |
| *G06N 5/04* | (2006.01) |
| *G06N 20/00* | (2019.01) |
| *G06F 16/93* | (2019.01) |

(52) U.S. Cl.
CPC ...... *G06F 16/24578* (2019.01); *G06F 16/248* (2019.01); *G06F 16/93* (2019.01); *G06N 5/048* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,533,148 B1* | 9/2013 | Feuersanger | G06F 16/24578 706/62 |
| 2010/0131523 A1* | 5/2010 | Yu | G06Q 10/107 707/756 |
| 2012/0284270 A1* | 11/2012 | Lee | G06F 16/93 707/737 |

OTHER PUBLICATIONS

Sørensen-Dice coefficient, Wikipedia, Jul. 29, 2018.

* cited by examiner

*Primary Examiner* — Thu Nguyet T Le
(74) *Attorney, Agent, or Firm* — Invoke

(57) ABSTRACT

Techniques for generating a report recommendation are disclosed. A system receives a request to display a report. The system computes report relevancy scores for other reports, based at least in part on a set of rules including one or more report relevancy criteria. Each report relevancy score measures relevancy of a particular report to the requested report. The system determines that a particular report relevancy score, associated with one of the other reports, satisfies one or more report recommendation criteria. Responsive to the request to display the requested report, the system displays the requested report and, based on the particular report relevancy score satisfying the one or more report recommendation criteria, also displays a recommendation corresponding to the other report.

20 Claims, 14 Drawing Sheets

FIG. 4

ORACLE

Invoice Register Report

400
Mary Johnson
Done

* Business Unit: --Select Value--
Supplier Type: --Select Value--
Supplier: --Select Value--
Supplier Number: --Select Value--
Entered By: --Select Value--
Invoice Group: --Select Value--
Invoice Type: --Select Value--
Invoice Number Between: --Select Value-- - --Select Value--
Entered Date Between: [ ] - [ ]
Accounting Date Between: [ ] - [ ]

Unvalidated Invoices Only
Canceled Invoices Only
Currency: --Select Value--
Original Amount Between: [ ] - --Select Value--
Purchases Order Between: --Select Value-- - --Select Value--

Apply   Reset

No data to display.
Refresh

Related Reports
- Payables To Ledger Reconciliation
- Payment Register
- Invoicing Register
- Bank Statement Report

RECOMMENDATIONS
404

REQUESTED REPORT
402

Text Analysis 500

| Report Names | Payables Invoice Register | Payables Payment Register | Account Analysis | Trial Balance | Transaction Register | Adjustment Register | Bills Adjustment |
|---|---|---|---|---|---|---|---|
| Payables Invoice Register | 100 | 70 | 6 | 7 | 38 | 39 | 6 |
| Payables Payment Register | 70 | 100 | 12 | 0 | 38 | 56 | 24 |
| Account Analysis | 6 | 12 | 100 | 17 | 20 | 14 | 8 |
| Trial Balance | 7 | 0 | 17 | 100 | 15 | 0 | 0 |
| Transaction Register | 38 | 38 | 20 | 15 | 100 | 42 | 7 |
| Adjustment Register | 39 | 56 | 14 | 0 | 42 | 100 | 62 |
| Bills Adjustment | 6 | 24 | 8 | 0 | 7 | 62 | 100 |

FIG. 7A

Log Data 700

| User | Report Name | Visits |
|---|---|---|
| Mary Johnson | Account Analysis | 5 |
| | Trial Balance Report | 4 |
| | Mary's Jun-10 Report | 10 |
| Casey Brown | Payables to Ledger Reconciliation | 23 |
| | Invoice Register | 14 |
| | Payables Register | 34 |
| | Payment Register | 45 |
| Thomas Anderson | Budgetary Control | 3 |
| | Budget Import Report | 5 |
| | Budget Results Report | 2 |
| | Budget Analysis Report | 7 |

Log Data 704

| User | Report Name | Visits |
|---|---|---|
| Accounts Payable Manager Job Role | Account Analysis | 5 |
| | Trial Balance Report | 4 |
| | Mary's Jun-10 Report | 10 |
| | Payables to Ledger Reconciliation | 23 |
| | Invoice Register | 14 |
| | Payables Register | 34 |
| | Payment Register | 45 |
| Budget Manager Job Role | Budgetary Control | 3 |
| | Budget Import Report | 5 |
| | Budget Results Report | 2 |
| | Budget Analysis Report | 7 |

FIG. 7D

Log Analysis
706

| Report Name | Report Visits | Ratio to Total Report Visits | Percentage (Ratio x 100%) |
|---|---|---|---|
| Payment Register | 45 | 0.296052632 | 29.605263 |
| Payables Register | 34 | 0.223684211 | 22.368421 |
| Payables to Ledger Reconciliation | 23 | 0.151315789 | 15.131579 |
| Invoice Register | 14 | 0.092105263 | 9.2105263 |
| Mary's Jun-10 Report | 10 | 0.065789474 | 6.5789474 |
| Budget Analysis Report | 7 | 0.046052632 | 4.6052632 |
| Account Analysis | 5 | 0.032894737 | 3.2894737 |
| Budget Import Report | 5 | 0.032894737 | 3.2894737 |
| Trial Balance Report | 4 | 0.026315789 | 2.6315789 |
| Budgetary Control | 3 | 0.019736842 | 1.9736842 |
| Budget Results Report | 2 | 0.013157895 | 1.3157895 |

FIG. 8A

← Chart 800

| Report Name | Text Analysis | Click Analysis | Log Analysis | Relevancy Score |
|---|---|---|---|---|
| Invoicing Register | | | | |
| Payment Register | | | | |
| Payables to Ledger Reconciliation | | | | |
| Bank Statement Report | | | | |

FIG. 8B

← Chart 800

| Report Name | Text Analysis | Click Analysis | Log Analysis | Relevancy Score |
|---|---|---|---|---|
| Invoicing Register | 0.645 | | | |
| Payment Register | 0.451 | | | |
| Payables to Ledger Reconciliation | 0.090 | | | |
| Bank Statement Report | 0.411 | | | |

FIG. 8C

Chart 800

| Report Name | Text Analysis | Click Analysis | Log Analysis | Relevancy Score |
|---|---|---|---|---|
| Invoicing Register | 0.645 | - | | |
| Payment Register | 0.451 | 0.025 | | |
| Payables to Ledger Reconciliation | 0.090 | 0.257 | | |
| Bank Statement Report | 0.411 | - | | |

FIG. 8D

Chart 800

| Report Name | Text Analysis | Click Analysis | Log Analysis | Relevancy Score |
|---|---|---|---|---|
| Invoicing Register | 0.645 | - | 0.092 | |
| Payment Register | 0.451 | 0.025 | 0.296 | |
| Payables to Ledger Reconciliation | 0.090 | 0.257 | 0.151 | |
| Bank Statement Report | 0.411 | - | - | |

FIG. 8E

Chart 800

| Report Name | Text Analysis | Click Analysis | Log Analysis | Relevancy Score |
|---|---|---|---|---|
| Invoicing Register | 0.645 | - | 0.092 | 0.0921 |
| Payment Register | 0.451 | 0.025 | 0.296 | 0.1489 |
| Payables to Ledger Reconciliation | 0.090 | 0.257 | 0.151 | 0.2085 |
| Bank Statement Report | 0.411 | - | - | 0.0411 |

REPORT RECOMMENDATION ENGINE

TECHNICAL FIELD

The present disclosure relates to reports. In particular, the present disclosure relates to report recommendations.

BACKGROUND

A report is a visual representation of a filtered subset of business data. The business data may include one or more items of financial data (e.g., financial transactions, investment performance, account balances, budgets, etc.), human resources data (e.g., organizational charts, job titles, roles, work schedules, compensation, vacation accrual, performance tracking, etc.), customer data (e.g., names, companies, addresses, purchase histories, etc.), social media data (e.g., account information, social media posting histories, friends lists, etc.), product data (e.g., product names, SKU's, prices, inventory, etc.), or any other kind of business data or combination thereof. A given report may filter business data based on dates, amounts, categories, priorities, locations, names, or any other filtering criterion or combination thereof.

A reporting system is hardware and/or software that supplies functionality for running reports. A reporting system may support any number of reports. Typically, to determine which reports are supported and which of the supported reports are relevant to a particular purpose and/or topic of interest, a user accesses a search function in the reporting system to search for reports by name and/or category. Alternatively or additionally, a user may consult a user manual for the reporting system. Alternatively or additionally, a user may request assistance from a coworker or support professional. Reporting systems operated by large organizations and/or dealing with complex datasets may support dozens of reports, hundreds of reports, thousands of reports, or more. The more reports a reporting system supports, the harder it is for a user to determine which reports are supported and which of those are relevant to a particular purpose and/or topic of interest.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example of a graphical user interface in accordance with one or more embodiments;

FIGS. 7A-7D illustrate an example of a log analysis in accordance with one or more embodiments;

FIGS. 8A-8E illustrate an example of computing a report relevancy score in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. GENERATING A REPORT RECOMMENDATION
3.1. COMPUTING A REPORT RELEVANCY SCORE
4. ILLUSTRATIVE EXAMPLES
4.1. GRAPHICAL USER INTERFACE
4.2. TEXT ANALYSIS
4.3. CLICK ANALYSIS
4.4. LOG ANALYSIS
4.5. REPORT RELEVANCY SCORE
5. MISCELLANEOUS; EXTENSIONS
6. HARDWARE OVERVIEW
7. COMPUTER NETWORKS AND CLOUD NETWORKS
8. MICROSERVICE APPLICATIONS

1. GENERAL OVERVIEW

One or more embodiments allow a reporting system to generate report recommendations based on one or more report relevancy criteria. One or more of the report relevancy criteria may be based on data gathered based on users' report viewing behaviors. Thus, the reporting system may recommend reports by observing user's report viewing behaviors and learning which reports are most relevant to other reports. Report recommendations may change over time, as users continue to view reports, including through the recommendations themselves. Embodiments provide report recommendations more quickly and accurately than when users are required to depend on manual searches, user manuals, and/or institutional knowledge obtained from coworkers and support staff.

One or more embodiments described in this Specification and/or recited in the claims may not be included in this General Overview section.

2. ARCHITECTURAL OVERVIEW

Figure 1:
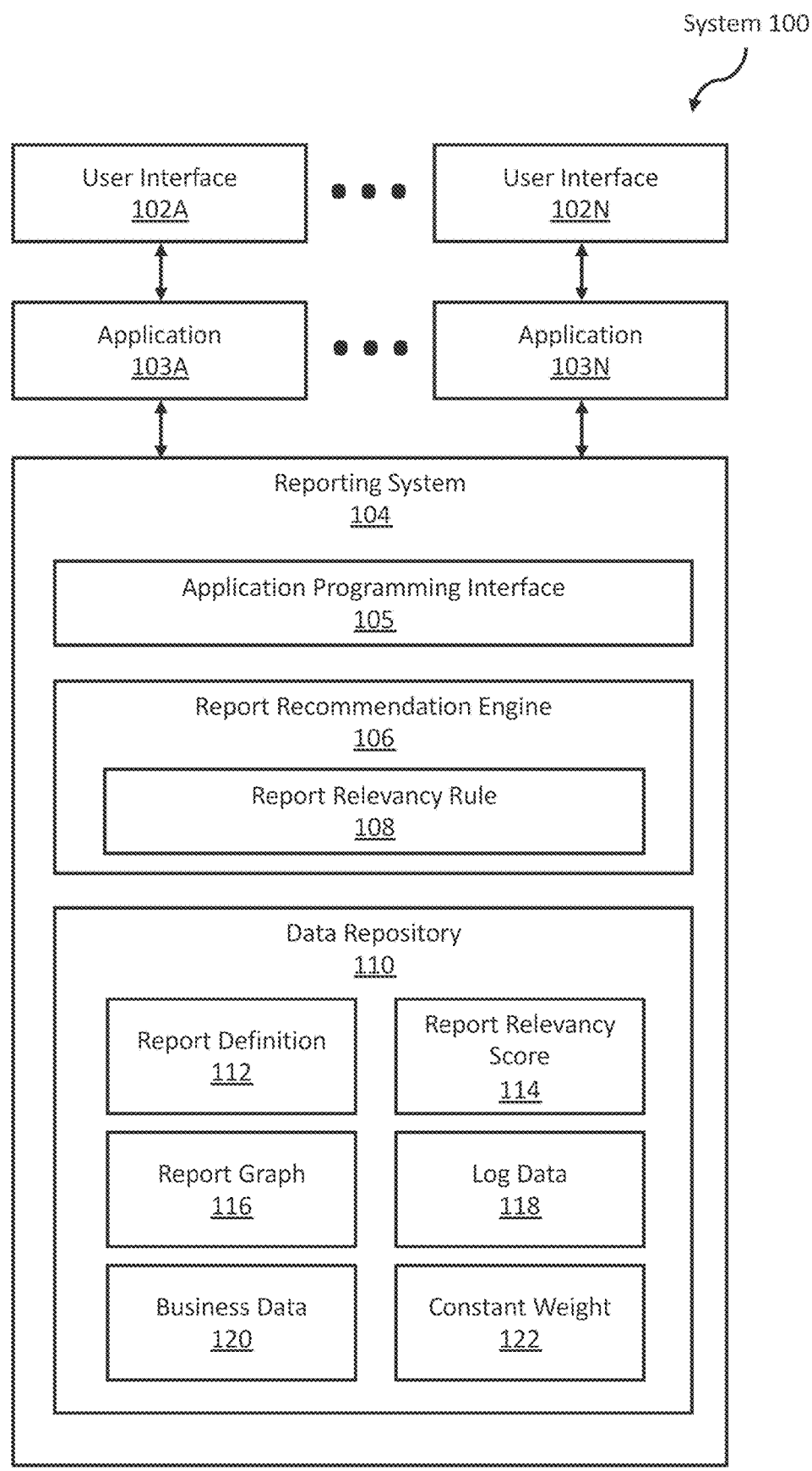
FIG. 1 illustrates a system in accordance with one or more embodiments.

FIG. 1 illustrates a system 100 in accordance with one or more embodiments. As illustrated in FIG. 1, system 100 includes one or more user interfaces 102A, 102N, one or more applications 103A, 103N, a reporting system 104, and components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the system 100 includes one or more applications 103A, 103N. An application is hardware and/or software configured to expose functionality to one or more end users, via one or more user interfaces 102A, 102N. An application 103A may be a financial application, human resources application, customer relationship management (CRM) application, supply chain management application, social media application, or any other kind of application or combination thereof. An application 103A may be a software-as-a-service (SaaS) application, a web-based application, a mobile application, a desktop application, or any other form of application or combination thereof.

In an embodiment, a user interface 102A refers to hardware and/or software configured to facilitate communications between a user and an application 103A. A user interface 102A renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user interface 102A are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface 102A is specified in one or more other languages, such as Java, C, or C++.

In an embodiment, an application 103A includes reporting functionality. Specifically, an application 103A may allow a user to request reports via a user interface 102A. In response to user input, the application 103A may access an application programming interface (API) 105 of a reporting system 104 to run the requested report(s). The application 103A may display the reports in a user interface 102A. Each instance of displaying a report in a user interface 102A may also be referred to as a "visit" or "view" of the report. In an embodiment, the application 103A displays, in the user interface 102A, one or more report recommendations generated by the reporting system 104.

In an embodiment, a reporting system 104 refers to hardware and/or software configured to perform operations described herein for running reports and generating report recommendations. Examples of operations for generating a report recommendation are described below. Specifically, the reporting system 104 may include a report recommendation engine 106 configured to generate report recommendations. The report recommendation engine 106 may generate report recommendations based on a set of one or more report relevancy rules 108. A report relevancy rule 108 is a set of one or more codified criteria for determining whether one report is relevant to another report. In an embodiment, a report relevancy rule 108 includes a linear weighted function, or one or more terms of a linear weighted function, used to compute a report relevancy score.

In an embodiment, the system 100 includes a data repository 110. The data repository 110 may store one or more report definitions 112. A report definition 112 defines a set of one or more filters to apply to business data 120, to run a particular report. Alternatively or additionally, the data repository 110 may store one or more report relevancy scores 114. A report relevancy score 114 is a value (e.g., a number, an alphanumeric sequence, or some other kind of value or combination thereof) that measures how relevant one report is to another report. Alternatively or additionally, the data repository 110 may store a report graph 116. A report graph 116 stores data associated with report views and/or navigation paths between different reports. Specifically, a report graph 116 may store data gathered when one or more users navigate between reports via report recommendations. An example of a report graph 116 is described below. The report recommendation engine 106 may use a report graph 116 to perform a click analysis, as described herein. Alternatively or additionally, the data repository 110 may store log data 118. Log data 118 is information, other than a report graph 116, that describes users' visits of reports. The reporting system 104 may obtain log data 118 from application-specific log data (not shown) generated and stored by one or more applications 103A, 103N. Alternatively or additionally, the data repository 110 may store one or more constant weights 122. A constant weight 122 is a numeric constant that applies to a particular term of a linear weighted function used to compute a report relevancy score. In an embodiment, a constant weight 122 is user-configurable. A user may configure a constant weight 122 via a user interface 102A. In an embodiment, a user configures multiple constant weights 122 to establish which terms of a linear weighted function carry more weight when determining the relevancy of one report to another report.

In one or more embodiments, a data repository 110 is any kind of storage unit and/or device (e.g., a file system, database, collection of tables, or any other storage mechanism) for storing data. Further, a data repository 110 may include multiple different storage units and/or devices. The multiple different storage units and/or devices may or may not be of the same type or located at the same physical site. Further, a data repository 110 may be implemented or may execute on the same computing system as other components of the system 100. Alternatively or additionally, a data repository 110 may be implemented or executed on a computing system separate from one or more other components of the system 100. A data repository 110 may be communicatively coupled to a report recommendation engine 106 via a direct connection or via a network.

Information describing report definitions 112, report relevancy scores 114, a report graph 116, log data 118, business data 120, and/or constant weights 122 may be implemented across any of components within the system 100. However, this information is illustrated within the data repository 110 for purposes of clarity and explanation.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/ or transmitter, a base station, a communication management device, a router, a switch, a controller, an access point, and/or a client device.

3. GENERATING REPORT RECOMMENDATIONS

Figure 2:
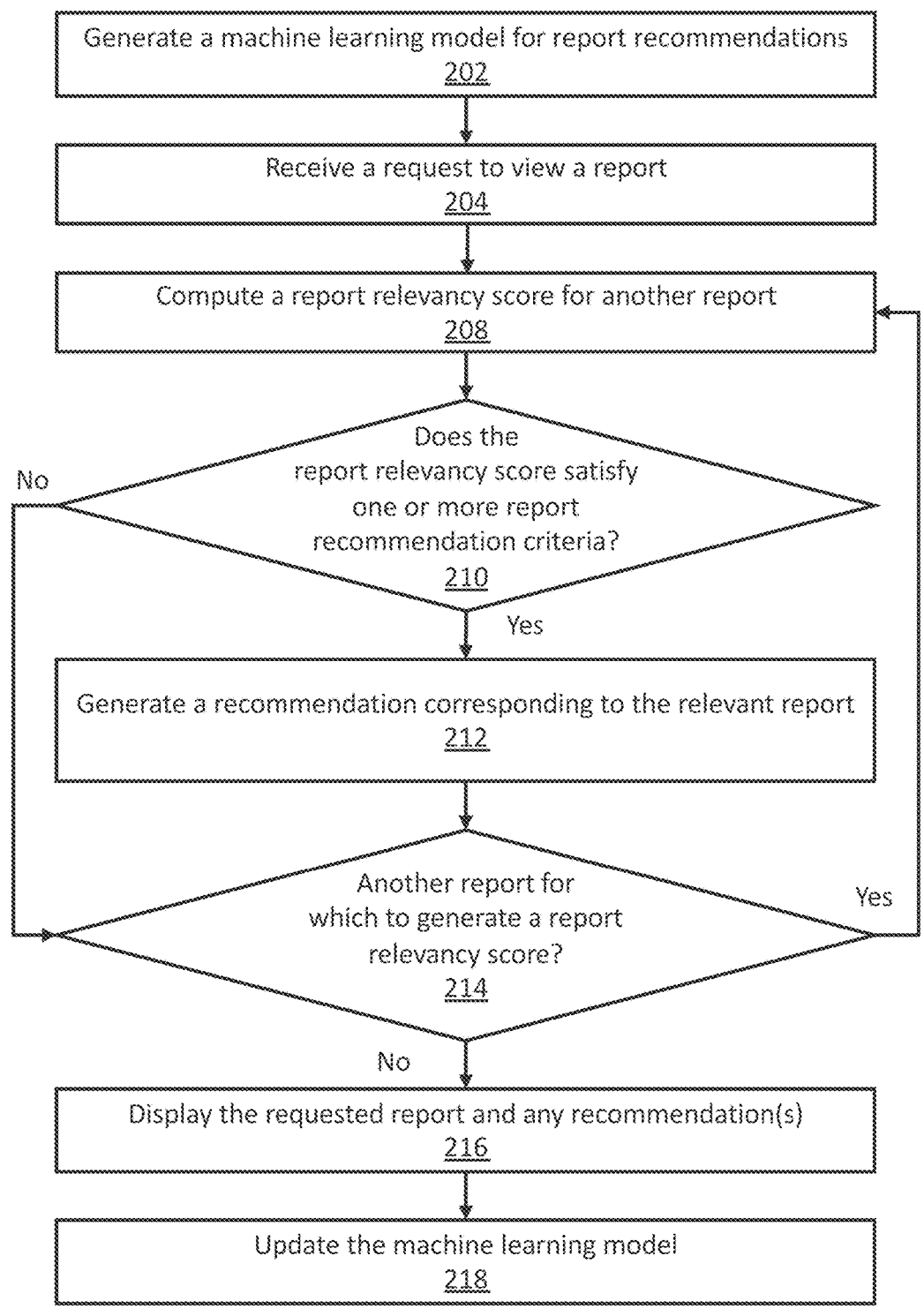
FIG. 2 illustrates an example set of operations for generating a report recommendation in accordance with one or more embodiments.

FIG. 2 illustrates an example set of operations for generating a report recommendation in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system (e.g., system 100 of FIG. 1) generates a machine learning model for report recommendations (Operation 202). The system may obtain labeled training data that maps one or more report features to one or more report relevancy criteria. The report features include, for each report, data associated with that report, such as a report name, number of visit, dwell time, or any other data associated with the report or combination thereof. Mapping report features to report relevancy criteria may indicate, for two or more reports, a corresponding report relevancy score based on the report relevancy criteria. Generating the machine learning model may use supervised machine learning techniques based on the labeled training data.

In an embodiment, the system receives a request to view a report (Operation 204). As described below, in addition to displaying the requested report, the system may generate a report recommendation to be displayed along with the report. In an embodiment, the system computes a report relevancy score for another report (Operation 208), i.e., a report other than the requested report, relative to the requested report. The system may compute the report relevancy score in response to the request to view the requested report. Alternatively, the system may include a background service that computes report relevancy scores on an ongoing basis and/or according to a schedule. If a background service is used, then when the system receives a request to view a report, the system may access precomputed report relevancy scores. In an embodiment, to compute a report relevancy score, the system applies data (i.e., data applicable to one or more report relevancy criteria, as described herein) associated with multiple reports to a machine learning model. Alternatively or additionally, the system may use a linear weighted function to compute a report relevancy score. An example set of operations for computing a report relevancy score is described below.

In an embodiment, the system determines whether the report relevancy score satisfies a set of one or more report recommendation criteria (Operation 210). The set of one or more report recommendation criteria determines, based on a report relevancy score, whether to display a recommendation corresponding to the other report. A report recommendation criterion may define a threshold value for the report relevancy score. The threshold value may be either a maximum value or a minimum value that the report relevancy score must meet to qualify as sufficiently relevant. Alternatively or additionally, a report recommendation criterion may define a range of report relevancy scores that qualify as sufficiently relevant. Alternatively or additionally, a report recommendation criterion may define a specific value of a report relevancy score that qualifies as sufficiently relevant. A system may use many different kinds of report recommendation criteria.

In an embodiment, if the report relevancy score satisfies the set of one or more report recommendation criteria, then the system generates a recommendation corresponding to the relevant report (Operation 212). The recommendation may include a link to the relevant report, to be displayed along with the requested report. Alternatively or additionally, the recommendation may include information about the relevant report, such as the report's name, category, number of views, report author, or any other kind of information about the report or combination thereof.

In an embodiment, the system determines whether there is another report for which to generate a report relevancy score (Operation 214). The system may generate report relevancy scores for all reports supported by the system. Alternatively, the system may generate report relevancy scores for only a subset of reports supported by the system. The system may generate report relevancy scores for all reports in a particular category, all reports created by a particular user (e.g., by an administrator as opposed to user-specific reports), all reports created on or after a particular date, or all reports that satisfy one or more other criteria, or any combination thereof. In an embodiment, if there is another report for which to generate a report relevancy score, then the system computes a report relevancy score for that report (Operation 208).

In an embodiment, when the system has completed generating recommendations based on report relevancy scores, the system displays the requested report and the recommendation(s), if any (Operation 216). If the system does not identify any reports as being sufficiently relevant, then the system may display the requested report without any recommendations. If the system identifies multiple reports as being sufficiently relevant, then the system may order the displayed recommendations based on one or more ordering criteria. An ordering criterion may be based on report relevancy scores, report names, numbers of views, any other information associated with a recommendation, or any combination thereof.

In an embodiment, if the system uses a machine learning model to compute report relevancy scores, the system updates the machine learning model (Operation 218). The system may obtain unlabeled data, corresponding to reporting activity (e.g., report views, dwell times, etc.) that occurred after the system trained the machine learning model. Updating the machine learning model may use unsupervised machine learning techniques based on the unlabeled data.

3.1. Computing a Report Relevancy Score

Figure 3:
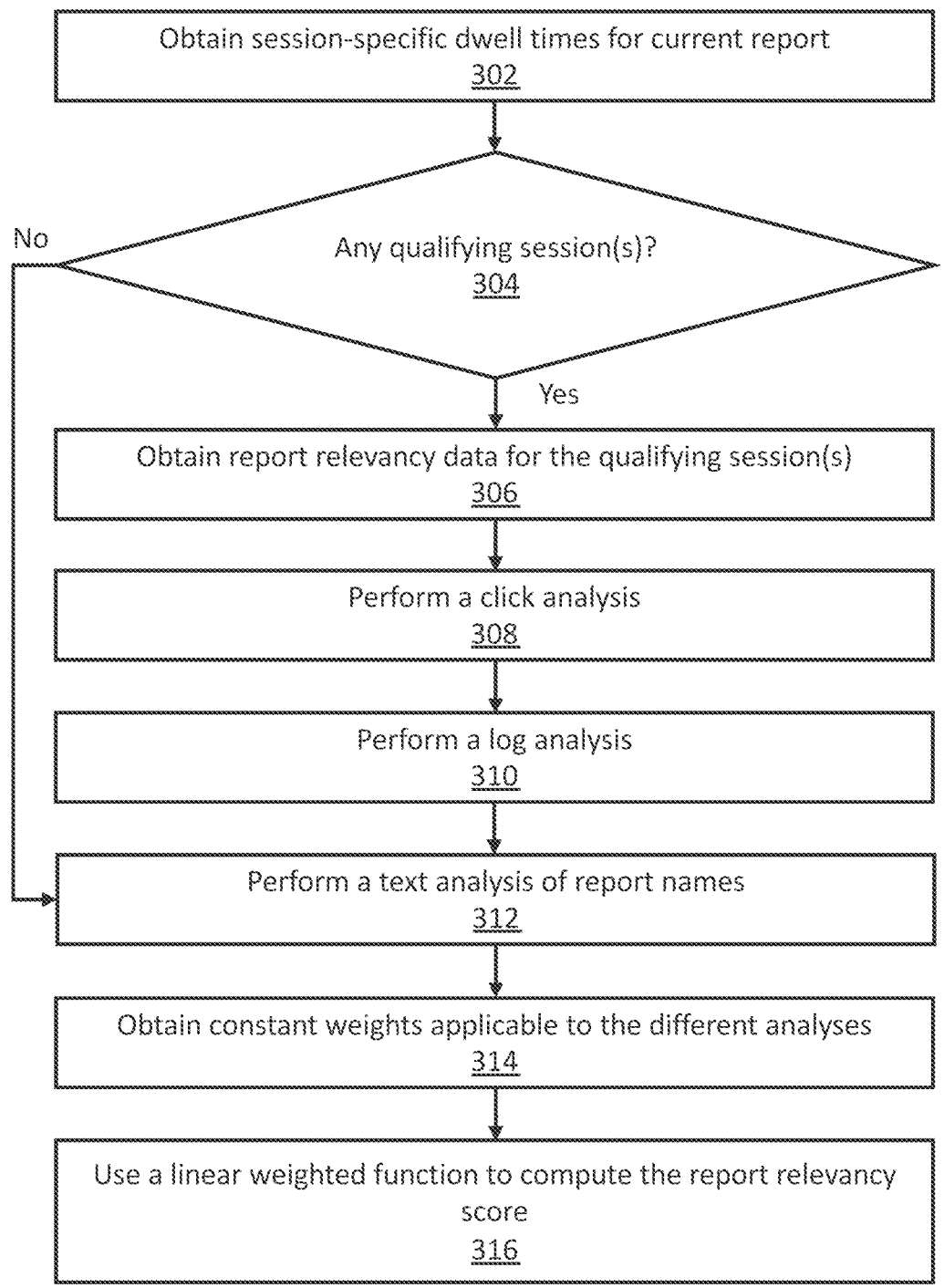
FIG. 3 illustrates an example set of operations for computing a report relevancy score in accordance with one or more embodiments.

FIG. 3 illustrates an example set of operations for computing a report relevancy score in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, a system computes a report relevancy score using data gathered from login sessions during which one or more users viewed one or more reports. The system may store the data in one or more report graphs, as described below. A user's report viewing behavior during a session may provide the system with insight into which reports are relevant to each other. However, in an embodiment, the system does not treat all report viewing behavior as applicable to report relevancy scores. If a user accesses a particular report and then quickly accesses a different report, the short dwell time for the first report (i.e., time during which the first report was displayed in a user interface, before the user navigated elsewhere or the session timed out) may indicate that the first report was not relevant to the user's particular purpose and/or topic of interest. In one example, a user accesses a report, realizes that the report is not relevant to their particular purpose and/or topic of interest, and quickly accesses a different report. In such cases, the fact that the user navigated from the first report to another report is less likely to indicate that the two reports are relevant to each other. In an embodiment, to help filter out such cases, the system obtains session-specific dwell times for the current report (Operation 302). For the purposes of this discussion, if the system computes report relevancy scores in response to receiving a request to view a report, the "current" report may be the requested report. Alternatively, if the system computes report relevancy scores as a background process, the "current" report may be the report relative to which the system is currently computing report relevancy scores (i.e., for which the system is determining other relevant reports).

In an embodiment, the system determines whether there are any qualifying sessions (Operation 304). The system may store a threshold dwell time, below which a report view is not included when computing report relevancy scores. A qualifying session may be a session during which the dwell time, for the current report, meets or exceeds the threshold dwell time. For qualifying sessions, a report that a user viewed after the current report may be more likely to be relevant to the current report, based on one or more report relevancy criteria as discussed below. To help preserve computing resources and/or improve the quality of report relevancy scores, the system may ignore data from sessions in which the dwell time for the current report did not meet or exceed the threshold dwell time. However, the system may still compute a report relevancy score based on one or more other report relevancy criteria, such as a text analysis (Operation 312), that is/are not dependent on users' report viewing behaviors.

In an embodiment, for each qualifying session, the system obtains report relevancy data (Operation 306). Report relevancy data includes data that is applicable to one or more report relevancy criteria. Report relevancy data may include a number of views of the current report from another report, a total number of views of the current report from all other reports, a dwell time associated with the current report (e.g., an average dwell time, median dwell time, total dwell time, or some other measure of dwell time or combination thereof), a maximum dwell time for all reports, or any other data applicable to one or more report relevancy criteria, or any combination thereof. The system may obtain report relevancy criteria from one or more report graphs. Alternatively or additionally, the system may obtain report relevancy criteria from one or more logs (e.g., log files, database tables storing log data, etc.), and/or from some other source.

In an embodiment, the system performs a click analysis (Operation 208) with respect to the current report. A click analysis computes a metric associated with one or more users' report viewing behaviors, such as visits to the current report, visits to other reports from the current report, dwell time, or any other kind of report viewing behavior or combination thereof. In an embodiment, click analysis uses data stored in one or more report graphs. An example of a click analysis is described below.

In an embodiment, the system performs a log analysis (Operation 310) with respect to the current report. A log analysis mines log data to obtain data regarding one or more users' report viewing behaviors. Log data may be different from data stored in a report graph. Specifically, data stored in a report graph may include data gathered when one or more users navigate between reports via report recommendations. Log data may include data gathered when one or more users view reports via mechanisms other than report recommendations. In one example, as illustrated in FIG. 1, multiple applications use a reporting system's API to access reporting functionality. Different applications may include different mechanisms for requesting reports. Some or all of those mechanisms may not include report recommendations. Log analysis may mine log data in order to improve the quality of a report relevancy score based on that additional data. An example of a log analysis is described below.

In an embodiment, the system performs a text analysis (Operation 312). The system may perform a text analysis even if there are no qualifying sessions as described above. Text analysis may compute a metric (e.g., a Sorensen-Dice coefficient, or some other metric or combination thereof) indicating the degree of similarity between the name of the current report and the name(s) of one or more other reports. Alternatively or additionally, text analysis may compute a metric indicating the degree of similarity between the contents (e.g., field names, descriptions, etc.) of two or more reports. In general, text analysis may compute a metric indicating a degree of similarity between text data associated with two or more reports. An example of a text analysis is described below.

In an embodiment, a report relevancy score is based on the results of multiple report analyses, i.e., multiple metrics computed according to one or more report relevancy criteria. The multiple analyses may include a click analysis, a log analysis, a text analysis, or any other report analysis or combination thereof. The system may compute the report relevancy score as a linear weighted function, where different terms in the linear weighted function correspond to the results of the different analyses. Applying different weights to the different terms may tune the function to provide a more accurate report relevancy score. In an embodiment, the system obtains constant weights applicable to the different analyses (Operation 314). The constant weights applicable to the results of the different analyses may be user-configurable, in which case the system may obtain the constant weights from user-configured settings data. If no qualifying sessions were found, the system may use a default constant weight (e.g., zero or some other default constant weight) for terms corresponding to analyses that were not performed.

In an embodiment, the system uses a linear weighted function to compute the report relevancy score (Operation 316). The linear weighted function receives, as inputs, the constant weights and results of the different analyses. The resulting value of the linear weighted function is the report relevancy score. An example of computing a report relevancy score using a linear weighted function is described below.

4. ILLUSTRATIVE EXAMPLES

Detailed examples are described below for purposes of clarity. Components and/or operations described below should be understood as specific examples which may not be applicable to certain embodiments. Accordingly, components and/or operations described below should not be construed as limiting the scope of any of the claims.

4.1. Graphical User Interface

FIG. 4 illustrates an example of a graphical user interface (GUI) 400 in accordance with one or more embodiments. Specifically, the GUI 400 displays a requested report 402 ("Invoice Register Report"). In this example, the requested report 402 includes user-selectable parameters for filtering business data according to a template defined for the requested report 402. Depending on the parameters selected, the requested report 402 may display different filtered subsets of business data. In addition, the GUI 400 includes report recommendations 404. Specifically, in this example, the GUI 400 displays four report recommendations, corresponding to reports that the system has determined to be relevant to the requested report 402. The GUI displays each report recommendation as the title of the relevant report, which also is a link to display that report. When a user selects (e.g., clicks or taps) a link to a recommended report, the system may display a new set of recommendations along with the selected report, based on report relevancy scores associated with that report.

4.2. Text Analysis

Figure 5:
FIG. 5 illustrates an example of a text analysis in accordance with one or more embodiments.

FIG. 5 illustrates an example of a text analysis 500 in accordance with one or more embodiments. Specifically, FIG. 5 shows, for seven different reports, metrics indicating the similarities between the different reports' names. In this example, the text analysis 500 is represented as percentages. As shown in FIG. 5, each report's name is one hundred percent similar to itself. When generating report recommendations, the system may ignore any reports with a text analysis metric of one hundred, to avoid recommending the same report that was already requested.

In an embodiment, text analysis computes a metric (e.g., a Sorensen-Dice coefficient, or some other metric or combination thereof) indicating the degree of similarity between the name of the current report and the name(s) of one or more other reports. Text analysis may be case-sensitive or case-insensitive. If a report is stored in a particular location in a system (e.g., in a particular directory path), text analysis may include some or all of the location when computing the similarity metric.

As one example, a system computes a case-insensitive Sorensen-Dice coefficient for two reports named "Adjustment Register" and "Payment Register." Text analysis converts both names into character pairs. The report name "Adjustment Register" includes sixteen character pairs: {Ad, dj, ju, us, st, tm, me, en, nt, Re, eg, gi, is, st, te, er}. The report name "Payment Register" includes thirteen character pairs: {Pa, ay, ym, me, en, nt, Re, eg, gi, is, st, te, er}. The Sorensen-Dice coefficient is defined as a function of the number of pairs in common between two alphanumeric strings s1 and s2 and the total pairs in the two strings:

$$S\emptyset\text{rensen-Dice}(s1, s2) = \frac{2*|\text{pairs}(s1) \cap \text{pairs}(s2)|}{|\text{pairs}(s1)| + |\text{pairs}(s2)|}$$

In this example, taking s1 as "Adjustment Register" and s2 as "Payment Register," the strings have ten pairs in common: {st, me, en, nt, re, eg, gi, is, te, er}.

$$S\emptyset\text{rensen-Dice}(s1, s2) = \frac{2*10}{29} = 0.6896551724137931$$

Using this approach, text analysis computes a 68.97 percent similarity between the report names "Adjustment Register" and "Payment Register." Text analysis may include a threshold similarity score for treating two report names as sufficiently similar. In an embodiment, the threshold similarity score is fifty percent (50%). In this example, the similarity metric for the report names "Adjustment Register" and "Payment Register" meets the threshold similarity score of 50%.

4.3. Click Analysis

Figure 6:
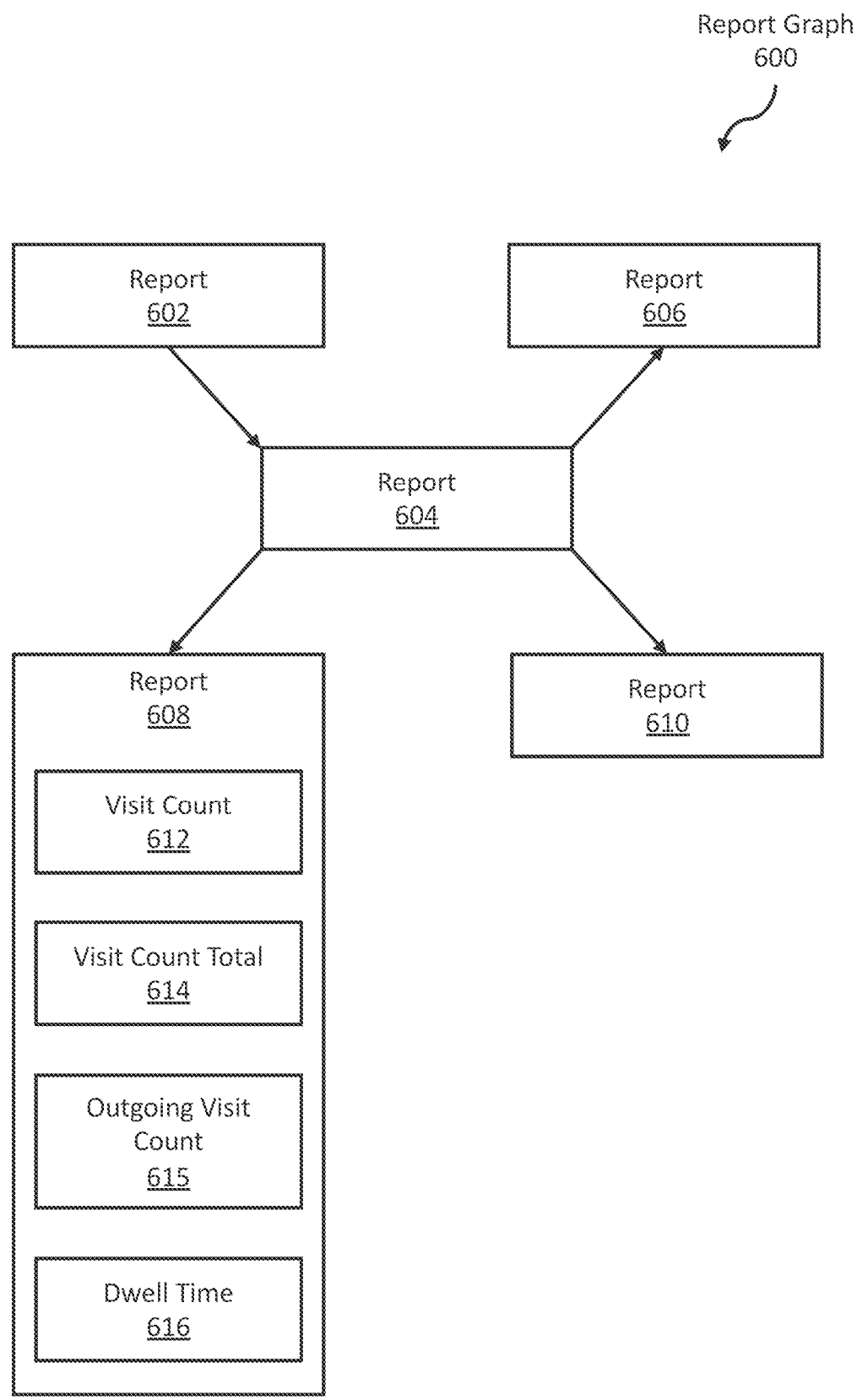
FIG. 6 illustrates an example of a report graph in accordance with one or more embodiments.

In an embodiment, click analysis uses data stored in a report graph. FIG. 6 illustrates an example of a report graph 600 in accordance with one or more embodiments. Each node in the report graph 600 corresponds to a different report. The report graph 600 includes data that describes one or more users' report viewing behaviors. In the example of FIG. 6, report node 602 references report node 604, indicating that one or more users visited the report represented by report node 604 from the report represented by report node 602. Report node 604 references report nodes 606, 608, and 610, indicating that one or more users visited one or more of the reports represented by report nodes 606, 608, and 610 from the report represented by report node 604. In an embodiment, the references between different nodes correspond to visits using report recommendations (e.g., when a user selects a recommended report title as discussed above). In an embodiment, references between report nodes are stored as visit counts, as described below.

In an embodiment, a report node 608 includes one or more visit counts 612. The visit count 612 is a number of visits to the report represented by report node 608 from another report. For example, the visit count 612 may be a number of visits to the report represented by report node 608 from the report represented by report node 604. A report node 608 may include multiple visit counts 612, corresponding to visits from multiple reports. When a user visits the report represented by report node 608 from another report, the corresponding visit count 612 is incremented by one. In an embodiment, a visit count 612 is incremented only when the visit occurs via a report recommendation.

In an embodiment, a report node 608 includes a visit count total 614. The visit count total 614 is a total number of visits to the report represented by report node 608 from other reports. If the report has only been visited from one other report, then the visit count total 614 may be equal to the corresponding visit count 612. If the report has been visited from multiple other reports, then the visit count total 614 may be larger than any individual visit count 612. When a user visits the report represented by report node 608 from another report, the visit count total 614 is incremented by one. In an embodiment, a visit count total 614 is incremented only when the visit occurs via a report recommendation.

In an embodiment, a report node 608 may include an outgoing visit count 615. The outgoing visit count 615 is the total number of times other reports have been visited from the report represented by report node 608. When a user visits another report from the report represented by report node 608, the outgoing visit count 615 is incremented by one. In an embodiment, an outgoing visit count 615 is incremented only when the visit occurs via a report recommendation.

Alternatively or additionally, a report node 608 may include a dwell time 616. The dwell time 616 is a metric corresponding to one or more users' dwell time when viewing the report represented by the report node 608. In an embodiment, the dwell time 616 is a mean dwell time for views of the report. Alternatively, the dwell time 616 may be a median, mode, range, maximum, minimum, or any other dwell time metric or combination thereof. When a user views a report, the corresponding dwell time 616 is updated accordingly, to reflect the time the user spent viewing that report.

The following is an example of a formula used to compute a click analysis that measures how relevant the report represented by report node 608 is when a user requests the report represented by report node 604.

In this example, RI is a relevancy index corresponding to the result of the click analysis, i.e., the value computed by the formula. $VC_{604 \to 608}$ is a visit count corresponding to the number of visits to the report represented by report node 608 from the report represented by report node 604. $VT_{608}$ is the visit count total for report node 608, i.e., the total number of visits to the report represented by report node 608 from other reports. $VO_{604}$ is the outgoing visit count for the report represented by report node 604, i.e., the total number of times other reports have been visited from the report represented by report node 604. Using these terms, click analysis may compute RI as:

$$RI = \frac{VC_{604 \to 608}}{VT_{608}} * \frac{VC_{604 \to 608}}{VO_{604}} = \frac{VC^2_{604 \to 608}}{VT_{608} * VO_{604}}$$

When the formula above is used, RI is a value ranging from zero to one. Click analysis may filter for relevancy indices greater than zero.

In an embodiment, click analysis is at least partly a function of dwell time. In the following example, $DT_{608}$ is the dwell time for the report represented by report node 608. $DT_{604,max}$ is the maximum dwell time of any report visited from the report represented by report node 604. The formula for RI, above, may be adjusted to account for dwell time as follows:

$$RI = \frac{VC^2_{604 \to 608} * DT_{608}}{VT_{608} * VO_{604} * DT_{604,max} + 1}$$

In the formula above, 1 is added to the denominator to avoid dividing by zero (i.e., if $VT_{608}$, $VO_{604}$, and $DT_{604}$,max all are zero). The formula above measures how relevant the report represented by report node 608 is to the report represented by report node 604 based on multiple factors. Specifically, the formula takes into account: (1) the proportion of visits to the report represented by report node 608 from the report represented by report node 604, relative to visits to the report represented by report node 608 from all reports; (2) the proportion of visits from the report represented by report node 604 to the report represented by report node 608, relative to visits from the report represented by report node 604 to all reports; and (3) the dwell time for the report represented by report node 608, relative to dwell times for all reports visited from the report represented by report node 604. Combining two or more of these factors may provide a more accurate measure of report relevancy than if a single factor were considered in isolation.

4.4. Log Analysis

Figure 7B:
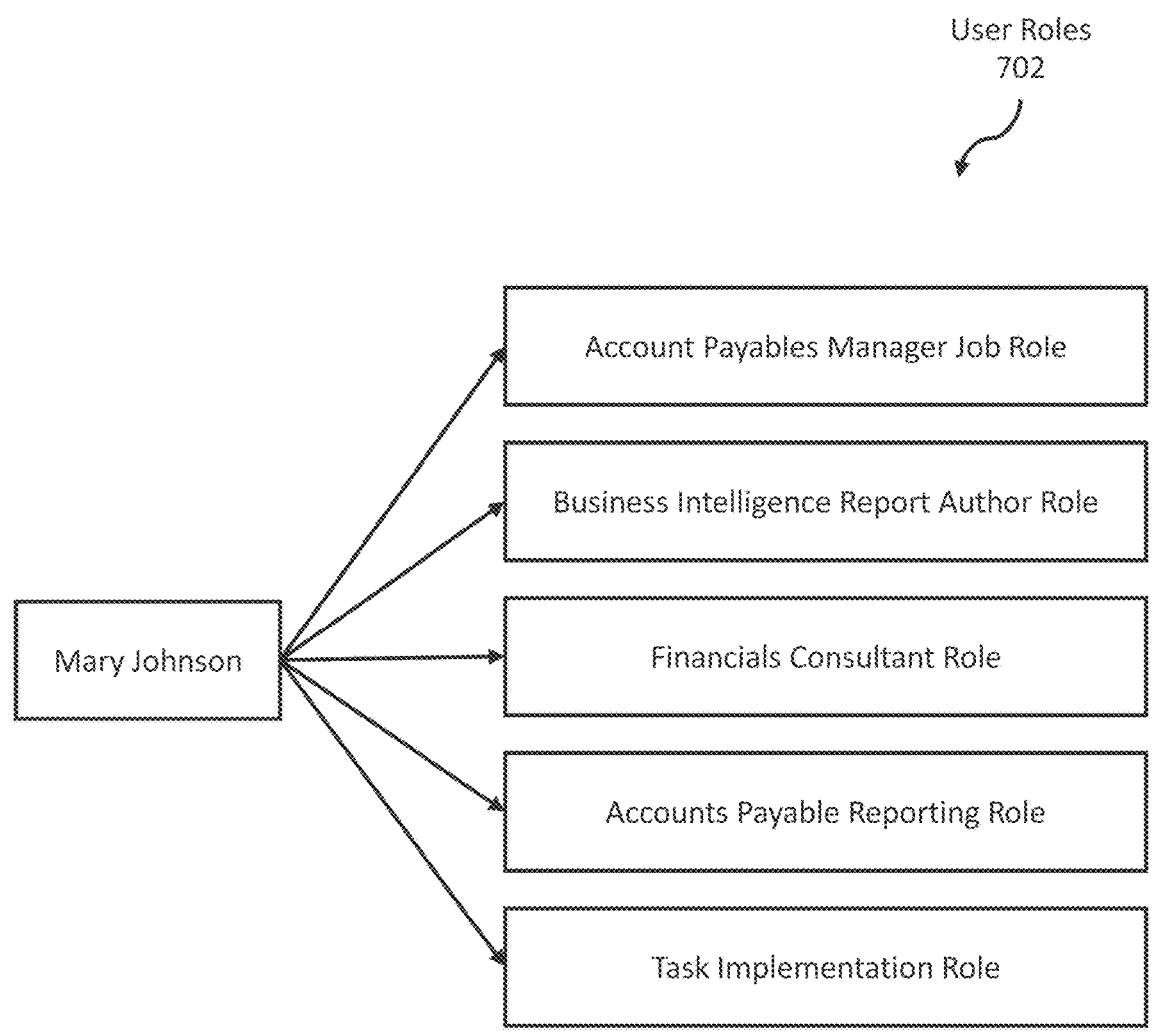
Figure 7C:

FIGS. 7A-7D illustrate an example of a log analysis in accordance with one or more embodiments. As illustrated in FIG. 7A, log data 700 shows numbers of visits to different reports by different users. In this example, the users are Mary Johnson, Casey Brown, and Thomas Anderson. As illustrated in FIG. 7B, one or more user roles 702 may be assigned to a particular user. In this example, five different user roles 702 are assigned to user Mary Johnson. In an embodiment, log analysis determines which user roles 702 are associated with each user, and determines how many times each report has been visited by users in each particular user role. FIG. 7C illustrates and example of report visits aggregated according to users' roles, rather than by individual user. Specifically, FIG. 7C illustrates numbers of report visits for uses in the "Accounts Payable Manager Job" and "Budget Manager Job" roles.

In an embodiment, log analysis determines the user role(s) assigned to the logged in user who requests a particular report, and computes relevancy scores based on the log data available for those user roles. Specifically, for a given user role assigned to the logged in user, log analysis computes a ratio of (a) the number of times users in that role have visited a particular report (i.e., a report that might be relevant to the requested report) to (b) a total number of report visits by users in that role. If multiple roles are assigned to the logged in user, log analysis may sum report visits across all of the assigned roles. Alternatively or additionally, log analysis may use an average, maximum, mean, mode, or some other metric or combination thereof of report visits across all of the assigned roles. In an example using the sum approach, users in role A have visited report X ten (10) times. Users in role B have visited report X twenty (20) times. Users in role A have visited reports, including but not limited to report X, one hundred (100) times in total. Users in role B have visited reports, including but not limited to report X, two hundred (200) times in total. In this example, if roles A and B both are assigned to the logged in user, then log analysis computes the ratio as:

$$\frac{10+20}{100+200} = \frac{30}{300} = 0.10$$

Continuing with the example of FIG. 7C, FIG. 7D illustrates an example for a logged in user having the "Accounts Payable Manager Job" and "Budget Manager Job" roles. There were one hundred fifty-two (152) total report views for users in those roles. Therefore, log analysis computes a ratio for the "Payment Register" report as:

$$\frac{45}{152} = 0.296052632$$

Multiplying by one hundred (100) give the ratio as a percentage.

4.5. COMPUTING A REPORT RELEVANCY SCORE

FIGS. 8A-8E illustrate an example of computing a report relevancy score in accordance with one or more embodiments. As illustrated in FIG. 8A, a chart 800 shows four different reports for which a system will compute report relevancy scores. In this example, a user has requested a report named "Invoice Register Report" (not shown). The relevancy scores are to be computed relative to the requested report. In this example, each report relevancy score is computed using a linear weighted function that includes, as its terms, the results of a text analysis, a click analysis, and a log analysis. Alternatively or additionally, a linear weighted function may include one or more terms not shown in this example. For example, a term may be based on a similarity of data displayed in two different reports, e.g., transactions in the same financial category. FIG. 8B shows the results of text analysis for the four reports. Specifically, the numbers correspond to a Sorensen-Dice coefficient that measures the similarity of each report name to the report name "Invoice Register Report." Based on text analysis alone, the report named "Invoicing Register" would have the highest report relevancy score.

FIG. 8C shows the results of click analysis for the four reports. In this example, FIG. 8C does not show any click analysis values for "Invoicing Register" or "Bank Statement Report," because neither of those reports have been visited from "Invoice Register Report." There are click analysis values for "Payables to Ledger Reconciliation" and "Payment Register," because both of those reports have been visited from "Invoice Register Report." Specifically, using the same nomenclature described above, the click analysis values are based on the following data. For ease of discussion, shortened nomenclature ($VC_1$, $VT_1$, etc.) is also provided.

$VC_1 = VC_{Invoice\ Register\ Report \rightarrow Payables\ to\ Ledger\ Reconciliation} = 3$
$VT_1 = VT_{Payables\ to\ Ledger\ Reconciliation} = 7$
$DT_1 = DT_{Payables\ to\ Ledger\ Reconciliation} = 20132$ milliseconds
$VC_2 = VC_{Invoice\ Register\ Report \rightarrow Payment\ Register} = 2$
$VT_2 = VT_{Payment\ Register} = 2$
$DT_2 = DT_{Payment\ Register} = 1294$ milliseconds Based on the data above, the system determines the following values.

$DT_{max} = DT_{Invoice\ Register\ Report, max} = 20132$
$VO = VO_{Invoice\ Register\ Report} = VC_1 + VC_2 = 5$ Using the same formula described above, click analysis computes the relevancy indices (in this example, rounded down in the thousandths place) for both reports:

$$RI_{Payables\ to\ Ledger\ Reconciliation} = \frac{3*3*20132}{7*5*20132+1} = 0.257$$

$$RI_{Payment\ Register} = \frac{2*2*1294}{2*5*20132+1} = 0.025$$

Based on click analysis alone, the report named "Payables to Ledger Reconciliation" would have the highest report relevancy score. FIG. 8D shows the results of log analysis for each report, based on a user named Mary Johnson with the roles "Accounts Payable Manager" and "Financial Analyst," using mined log data (not shown). Based on log analysis alone, the report named "Payment" would have the highest report relevancy score.

FIG. 8E shows report relevancy scores computed using a linear weighted function, using the results of the three different analyses. In this example, text analysis has a weight $K_1$ of 0.1, click analysis has a weight $K_2$ of 0.6, and log analysis has a weight $K_3$ of 0.3. Alternatively, the weights may be expressed as ratios of each other. For example:

$K_2 = 2K_3 = 3K_1$
$K_1:K_2:K_3 = 1:3:6$

In the graphical user interface illustrated in FIG. 4, all four report relevancy scores satisfy the report recommendation criteria. Links to the reports are displayed in the order of their respective report relevancy scores, from highest to lowest.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
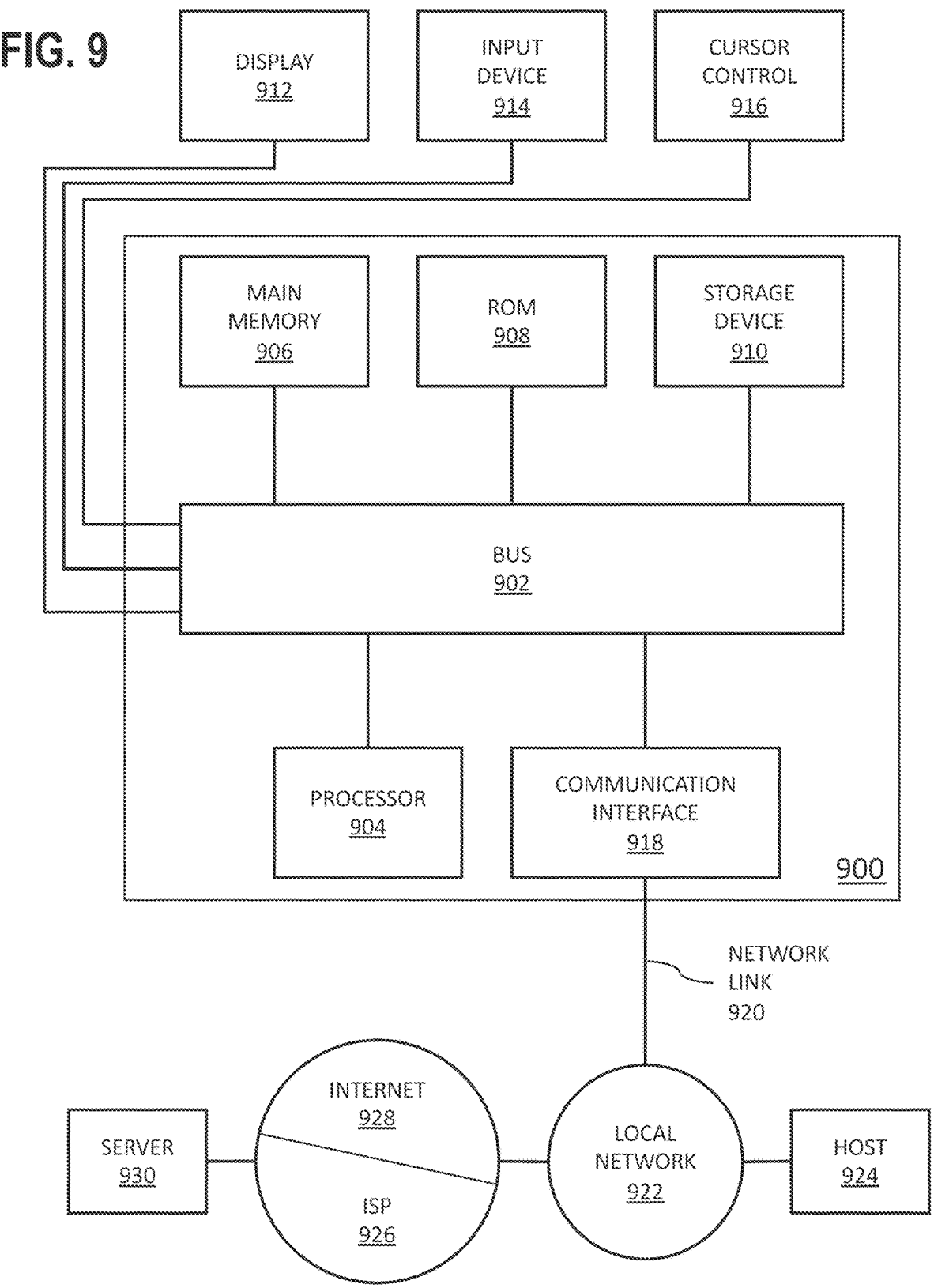
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or in addition, the computer system 900 may receive user input via a cursor control 916, such as a mouse, a trackball, a trackpad, a touchscreen, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. The display 912 may be configured to receive user input via one or more pressure-sensitive sensors, multi-touch sensors, and/or gesture sensors. Alternatively or in addition, the computer system 900 may receive user input via a microphone, video camera, and/or some other kind of user input device (not shown).

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 900 can receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

7. COMPUTER NETWORKS AND CLOUD NETWORKS

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the micro services manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   receiving a request to display a first report in a plurality of reports supported by a reporting system;
   computing a plurality of report relevancy scores for a plurality of other reports in the plurality of reports, based at least in part on a set of rules comprising one or more report relevancy criteria, wherein each report relevancy score in the plurality of report relevancy scores measures relevancy of a particular report in the plurality of other reports to the first report;
   determining that a first report relevancy score in the plurality of report relevancy scores, associated with a second report in the plurality of other reports, satisfies one or more report recommendation criteria;
   responsive to the request to display the first report:
      displaying the first report;
      based on the first report relevancy score satisfying the one or more report recommendation criteria: displaying a first recommendation corresponding to the second report.

2. The one or more media of claim 1, further storing instructions which, when executed by one or more processors, cause:
   determining that a second report relevancy score in the plurality of report relevancy scores, associated with a third report in the plurality of other reports, satisfies the one or more report recommendation criteria;
   responsive to the request to display the first report:
      based on the second report relevancy score satisfying the one or more report recommendation criteria: displaying a second recommendation corresponding to the third report.

3. The one or more media of claim 1, wherein computing the plurality of report relevancy scores is performed in response to receiving the request to display the first report.

4. The one or more media of claim 1, wherein the first report relevancy score is based at least in part on a similarity between a first name of the first report and a second name of the second report.

5. The one or more media of claim 1, wherein the first report relevancy score is based at least in part on a click analysis statistically linking one or more users' viewing of both the first report and the second report within a particular window of time.

6. The one or more media of claim 1, wherein the first report relevancy score is based at least in part on a click analysis for the second report, wherein the click analysis is based at least in part on a number of visits of the second report from the first report.

7. The one or more media of claim 6, wherein the click analysis is based at least in part on one or more of:
   (a) a first ratio of the number of visits of the second report from the first report to a total number of visits of reports from the first report; and
   (b) a second ratio of the number of visits of the second report from the first report to a total number of visits of the second report.

8. The one or more media of claim 1, wherein the first report relevancy score is based at least in part on a log analysis of log data comprising a number of visits, by one or more users, of the second report after the first report.

9. The one or more media of claim 8, wherein the log analysis based, at least in part, on user roles associated with the one or more users.

10. The one or more media of claim 1, further storing instructions which, when executed by one or more processors, cause:
    identifying a plurality of qualifying sessions in which one or more users' viewings of the first report meet, respectively, a minimum dwell time,
    wherein computing the plurality of report relevancy scores is performed using data from the plurality of qualifying sessions.

11. The one or more media of claim 1, wherein the one or more report relevancy criteria are associated with one or more user roles.

12. The one or more media of claim 1, wherein computing the first report relevancy score comprises applying a linear weighted function in which a plurality of constants are applied as weights to a plurality of terms of the linear weighted function.

13. The one or more media of claim 12, wherein values of at least two constants, in the plurality of constants applied as weights to the plurality of terms of the linear weighted function, are user-adjustable.

14. The one or more media of claim 1, wherein the one or more report relevancy criteria comprises a ratio of dwell time associated with the second report to maximum dwell time associated with one or more other reports.

15. The one or more media of claim 1, further storing instructions which, when executed by one or more processors, cause:
    generating a machine learning model, using supervised learning based on labeled training data that maps (a) one or more report features to (b) the one or more report relevancy criteria,
    wherein computing the plurality of report relevancy scores for a plurality of other reports comprises applying data associated with the first report and the plurality of other reports to the machine learning model;
    obtaining unlabeled data associated with one or more users' navigation of the reporting system;

updating the machine learning model, using unsupervised learning based on the unlabeled data.

16. The one or more media of claim 1, wherein the first report is a first visual representation of a first filtered subset of business data and the second report is a second visual representation of a second filtered subset of business data.

17. The one or more media of claim 1, wherein displaying the first recommendation is not responsive to any request to display the second report.

18. The one or more media of claim 1, further storing instructions which, when executed by one or more processors, cause:
   generating a machine learning model, using supervised learning based on labeled training data that maps (a) one or more report features to (b) the one or more report relevancy criteria,
   wherein computing the plurality of report relevancy scores for a plurality of other reports comprises applying data associated with the first report and the plurality of other reports to the machine learning model;
   obtaining unlabeled data associated with one or more users' navigation of the reporting system;
   updating the machine learning model, using unsupervised learning based on the unlabeled data;
   identifying a plurality of qualifying sessions in which one or more users' viewings of the first report meet, respectively, a minimum dwell time, wherein computing the plurality of report relevancy scores is performed using data from the plurality of qualifying sessions;
   determining that a second report relevancy score in the plurality of report relevancy scores, associated with a third report in the plurality of other reports, satisfies the one or more report recommendation criteria;
   responsive to the request to display the first report:
      based on the second report relevancy score satisfying the one or more report recommendation criteria: displaying a second recommendation corresponding to the third report,
   wherein computing the plurality of report relevancy scores is performed in response to receiving the request to display the first report,
   wherein the first report relevancy score is based at least in part on a similarity between a first name of the first report and a second name of the second report,
   wherein the first report relevancy score is based at least in part on a click analysis for the second report, wherein the click analysis is based at least in part on a number of visits of the second report from the first report, wherein the click analysis is based at least in part on one or more of:
      (a) a first ratio of the number of visits of the second report from the first report to a total number of visits of reports from the first report, and
      (b) a second ratio of the number of visits of the second report from the first report to a total number of visits of the second report,
   wherein the first report relevancy score is based at least in part on a log analysis of log data comprising a number of visits, by one or more users, of the second report after the first report,
   wherein the log analysis is based, at least in part, on user roles associated with the one or more users,
   wherein computing the first report relevancy score comprises applying a linear weighted function in which a plurality of constants are applied as weights to a plurality of terms of the linear weighted function,
   wherein values of at least two constants, in the plurality of constants applied as weights to the plurality of terms of the linear weighted function, are user-adjustable,
   wherein the one or more report relevancy criteria comprises a ratio of dwell time associated with the second report to maximum dwell time associated with one or more other reports,
   wherein the first report is a first visual representation of a first filtered subset of business data and the second report is a second visual representation of a second filtered subset of business data,
   wherein displaying the first recommendation is not responsive to any request to display the second report.

19. A system comprising:
   at least one device including a hardware processor;
   the system being configured to perform operations comprising:
   receiving a request to display a first report in a plurality of reports supported by a reporting system;
   computing a plurality of report relevancy scores for a plurality of other reports in the plurality of reports, based at least in part on a set of rules comprising one or more report relevancy criteria, wherein each report relevancy score in the plurality of report relevancy scores measures relevancy of a particular report in the plurality of other reports to the first report;
   determining that a first report relevancy score in the plurality of report relevancy scores, associated with a second report in the plurality of other reports, satisfies one or more report recommendation criteria;
   responsive to the request to display the first report:
      displaying the first report;
      based on the first report relevancy score satisfying the one or more report recommendation criteria: displaying a first recommendation corresponding to the second report.

20. A method comprising:
   receiving a request to display a first report in a plurality of reports supported by a reporting system;
   computing a plurality of report relevancy scores for a plurality of other reports in the plurality of reports, based at least in part on a set of rules comprising one or more report relevancy criteria, wherein each report relevancy score in the plurality of report relevancy scores measures relevancy of a particular report in the plurality of other reports to the first report;
   determining that a first report relevancy score in the plurality of report relevancy scores, associated with a second report in the plurality of other reports, satisfies one or more report recommendation criteria;
   responsive to the request to display the first report:
      displaying the first report;
      based on the first report relevancy score satisfying the one or more report recommendation criteria: displaying a first recommendation corresponding to the second report,
   wherein the method is performed by at least one device comprising a hardware processor.

* * * * *

UNITED STATES PATENT AND TRADEMARK OFFICE
CERTIFICATE OF CORRECTION

PATENT NO. : 11,222,028 B2
APPLICATION NO. : 16/248502
DATED : January 11, 2022
INVENTOR(S) : Pandey et al.

It is certified that error appears in the above-identified patent and that said Letters Patent is hereby corrected as shown below:

In the Specification

In Column 8, Line 21, delete "Sorensen-Dice" and insert -- Sørensen-Dice --, therefor.

In Column 9, Line 33, delete "Sorensen-Dice" and insert -- Sørensen-Dice --, therefor.

In Column 9, Line 42, delete "Sorensen-Dice" and insert -- Sørensen-Dice --, therefor.

In Column 9, Line 49, delete "Sorensen-Dice" and insert -- Sørensen-Dice --, therefor.

In Column 9, Line 55, delete "SØrensen" and insert -- Sørensen --, therefor.

In Column 9, Line 63, delete "SØrensen" and insert -- Sørensen --, therefor.

In Column 13, Line 1, delete "Sorensen-Dice" and insert -- Sørensen-Dice --, therefor.

In Column 20, Line 56, delete "micro services." and insert -- microservices. --, therefor.

In Column 21, Line 10, delete "micro services." and insert -- microservices. --, therefor.

In the Claims

In Column 22, Line 28, in Claim 9, after "analysis" insert -- is --, therefor.

Signed and Sealed this
Seventh Day of June, 2022

Katherine Kelly Vidal
*Director of the United States Patent and Trademark Office*